United States Patent [19]
Maddrell et al.

[11] Patent Number: 6,041,215
[45] Date of Patent: Mar. 21, 2000

[54] METHOD FOR MAKING AN ELECTRONIC BOOK FOR PRODUCING AUDIBLE SOUNDS IN RESPONSE TO VISUAL INDICIA

[75] Inventors: Richard Maddrell, Barrington, Ill.; Thomas L. Maser, Mequon, Wis.

[73] Assignee: Publications International, Ltd., Lincolnwood, Ill.

[21] Appl. No.: 09/052,832

[22] Filed: Mar. 31, 1998

Related U.S. Application Data

[62] Division of application No. 08/723,681, Sep. 30, 1996, Pat. No. 5,803,748.

[51] Int. Cl.[7] ...................................................... G09B 5/00
[52] U.S. Cl. ........................ 434/317; 434/169; 434/178; 434/308; 345/901
[58] Field of Search .................................... 434/169, 178, 434/185, 307, 308, 317, 338; 345/901

[56] References Cited

U.S. PATENT DOCUMENTS

| | | |
|---|---|---|
| Re. 28,199 | 10/1974 | Deb et al. . |
| 100,994 | 3/1870 | Fitch et al. . |
| D. 260,023 | 7/1981 | Pagani et al. . |
| D. 261,283 | 10/1981 | Becker et al. . |
| D. 264,786 | 6/1982 | Faas et al. . |
| D. 267,963 | 2/1983 | Alwell et al. . |
| D. 268,507 | 4/1983 | Alwell et al. . |
| D. 277,963 | 3/1985 | Bousman . |
| D. 285,318 | 8/1986 | Propson . |
| D. 311,566 | 10/1990 | Popek et al. . |
| D. 322,640 | 12/1991 | Billings . |
| D. 349,281 | 8/1994 | Luong . |
| 722,061 | 3/1903 | Waldo, Jr. . |
| 1,054,465 | 2/1913 | Sontheimer . |
| 1,475,430 | 11/1923 | Curwen . |
| 1,545,217 | 7/1925 | Thurber . |
| 1,638,277 | 8/1927 | Smith . |
| 1,670,254 | 5/1928 | Gowin . |
| 1,937,445 | 11/1933 | Smith . |
| 2,080,995 | 5/1937 | Baker et al. . |
| 2,156,551 | 5/1939 | Stark . |
| 2,227,318 | 3/1940 | Grant . |

(List continued on next page.)

FOREIGN PATENT DOCUMENTS

| | | |
|---|---|---|
| 0 578 486 A2 | 1/1994 | European Pat. Off. . |
| 3140735 A1 | 10/1981 | Germany . |
| 60-22363 | 2/1985 | Japan . |
| 61-6797 | 2/1986 | Japan . |
| 63-8100 | 1/1988 | Japan . |
| 63-56099 | 4/1988 | Japan . |
| 63-96898 | 5/1988 | Japan . |
| 1-101868 | 7/1989 | Japan . |
| 669760 A5 | 4/1989 | Switzerland . |
| 2108747 | 5/1983 | United Kingdom . |
| 2155858 | 10/1985 | United Kingdom . |
| 2174230 | 10/1986 | United Kingdom . |
| 81/02215 | 8/1981 | WIPO . |
| 91/06090 | 5/1991 | WIPO . |
| 91/07715 | 5/1991 | WIPO . |
| 93/17764 | 9/1993 | WIPO . |

*Primary Examiner*—Glenn E. Richmon
*Attorney, Agent, or Firm*—Lerner, David, Littenberg, Krumholz & Mentlik, LLP

[57] ABSTRACT

An apparatus for producing audible sounds in response to visual indicia in the nature of an electronic book. The electronic book is constructed from a plurality of leaves which may be formed from a continuous accordion folded sheet or individual modular folded sheets joined back-to-back to form the pages of the book. During construction, a spacer is internally provided within each leaf to create at least one internal passageway opening at one end of the leaves at a location forming the book's spine. An electronic circuit having pressure sensitive switches and conductive paths is provided on the surface of a dielectric substrate using conductive ink. The switches are arranged on elongated members which are inserted into a respective internal passageway within the leaves of the book. By activation of a switch by pressure applied to visual indicia on the leaves, audible sounds are produced by an on board electronic module.

44 Claims, 9 Drawing Sheets

U.S. PATENT DOCUMENTS

| | | |
|---|---|---|
| 2,444,355 | 6/1948 | Kniznick . |
| 2,524,143 | 10/1950 | Smith . |
| 2,826,844 | 3/1958 | Leika . |
| 2,997,306 | 8/1961 | Hicks . |
| 3,086,297 | 4/1963 | Kay . |
| 3,087,498 | 4/1963 | Vogel . |
| 3,096,271 | 7/1963 | Hespenheide . |
| 3,119,197 | 1/1964 | Adams . |
| 3,220,126 | 11/1965 | Gabrielsen . |
| 3,338,544 | 8/1967 | Schmidt . |
| 3,376,778 | 4/1968 | Musser . |
| 3,385,106 | 5/1968 | Fargo et al. . |
| 3,429,427 | 2/1969 | Wolf . |
| 3,430,381 | 3/1969 | Phipps . |
| 3,462,157 | 8/1969 | Barnett et al. . |
| 3,522,665 | 8/1970 | Kalt . |
| 3,529,832 | 9/1970 | Goetz et al. . |
| 3,540,132 | 11/1970 | Glass et al. . |
| 3,553,851 | 1/1971 | Paige . |
| 3,562,394 | 2/1971 | Kiepe . |
| 3,567,038 | 3/1971 | Ammann . |
| 3,579,857 | 5/1971 | Lamberson . |
| 3,592,098 | 7/1971 | Zadig . |
| 3,592,471 | 7/1971 | Swimmer et al. . |
| 3,594,937 | 7/1971 | Luchsinger . |
| 3,600,528 | 8/1971 | Leposavic . |
| 3,641,684 | 2/1972 | Paige . |
| 3,648,387 | 3/1972 | Lahr . |
| 3,662,078 | 5/1972 | Holiday . |
| 3,699,294 | 10/1972 | Sudduth . |
| 3,702,032 | 11/1972 | Doring . |
| 3,738,021 | 6/1973 | Hino et al. . |
| 3,741,565 | 6/1973 | Breitling et al. . |
| 3,744,150 | 7/1973 | Folson . |
| 3,756,627 | 9/1973 | Reist . |
| 3,766,683 | 10/1973 | Vennola . |
| 3,770,269 | 11/1973 | Elder . |
| 3,795,989 | 3/1974 | Greenberg et al. . |
| 3,798,806 | 3/1974 | Sanford . |
| 3,803,580 | 4/1974 | Shattuck . |
| 3,883,146 | 5/1975 | Johnson et al. . |
| 3,917,284 | 11/1975 | Doring . |
| 3,950,871 | 4/1976 | Rege . |
| 3,999,761 | 12/1976 | Daniels . |
| 4,002,355 | 1/1977 | Sendor . |
| 4,021,932 | 5/1977 | Lipps . |
| 4,044,229 | 8/1977 | Samreus . |
| 4,055,014 | 10/1977 | Schmidt et al. . |
| 4,096,577 | 6/1978 | Ferber et al. . |
| 4,102,067 | 7/1978 | Tarrant . |
| 4,104,809 | 8/1978 | Day et al. . |
| 4,123,631 | 10/1978 | Lewis . |
| 4,158,264 | 6/1979 | Orth . |
| 4,164,078 | 8/1979 | Goldfarb . |
| 4,169,592 | 10/1979 | Hall . |
| 4,173,832 | 11/1979 | Chen et al. . |
| 4,183,152 | 1/1980 | Harris, III . |
| 4,189,852 | 2/1980 | Chatlien . |
| 4,209,824 | 6/1980 | Kaufman . |
| 4,209,836 | 6/1980 | Wiggins, Jr. et al. . |
| 4,209,844 | 6/1980 | Brantingham et al. . |
| 4,214,125 | 7/1980 | Mozer et al. . |
| 4,222,188 | 9/1980 | Tarrant et al. . |
| 4,236,156 | 11/1980 | Eden . |
| 4,244,603 | 1/1981 | De Monti . |
| 4,258,096 | 3/1981 | LaMarche . |
| 4,261,563 | 4/1981 | Goldfarb . |
| 4,273,538 | 6/1981 | Ross . |
| 4,276,538 | 6/1981 | Eventoff et al. . |
| 4,277,133 | 7/1981 | Staehle . |
| 4,286,399 | 9/1981 | Funahashi et al. . |
| 4,299,041 | 11/1981 | Wilson . |
| 4,303,811 | 12/1981 | Parkinson . |
| 4,304,964 | 12/1981 | Wiggins, Jr. et al. . |
| 4,314,105 | 2/1982 | Mozer . |
| 4,326,356 | 4/1982 | Mason . |
| 4,331,836 | 5/1982 | Wiggins, Jr. et al. . |
| 4,334,771 | 6/1982 | Ryan, Jr. . |
| 4,337,375 | 6/1982 | Freeman . |
| 4,344,148 | 8/1982 | Brantingham et al. . |
| 4,348,191 | 9/1982 | Lipsitz et al. . |
| 4,355,984 | 10/1982 | Slavik et al. . |
| 4,358,278 | 11/1982 | Goldfarb . |
| 4,360,716 | 11/1982 | Fiorella . |
| 4,363,081 | 12/1982 | Wilbur . |
| 4,363,487 | 12/1982 | Hall . |
| 4,365,438 | 12/1982 | Nelson . |
| 4,366,463 | 12/1982 | Barket . |
| 4,366,957 | 1/1983 | Aldcroft et al. . |
| 4,384,169 | 5/1983 | Mozer et al. . |
| 4,384,170 | 5/1983 | Mozer et al. . |
| 4,391,845 | 7/1983 | Denley . |
| 4,392,053 | 7/1983 | Bockholt . |
| 4,403,965 | 9/1983 | Hawkins . |
| 4,406,626 | 9/1983 | Anderson et al. . |
| 4,411,628 | 10/1983 | Laughon et al. . |
| 4,423,290 | 12/1983 | Yoshida et al. . |
| 4,425,098 | 1/1984 | Doring . |
| 4,433,434 | 2/1984 | Mozer . |
| 4,434,567 | 3/1984 | LeVeau . |
| 4,435,831 | 3/1984 | Mozer . |
| 4,458,110 | 7/1984 | Mozer . |
| 4,466,801 | 8/1984 | Dittakavi et al. . |
| 4,469,327 | 9/1984 | Ulrich et al. . |
| 4,474,557 | 10/1984 | Clossey . |
| 4,488,679 | 12/1984 | Bockholt et al. . |
| 4,490,811 | 12/1984 | Yianilos et al. . |
| 4,497,126 | 2/1985 | Dejean . |
| 4,512,584 | 4/1985 | Propsom . |
| 4,516,260 | 5/1985 | Breedlove et al. . |
| 4,516,777 | 5/1985 | Nikora . |
| 4,531,310 | 7/1985 | Acson et al. . |
| 4,541,188 | 9/1985 | Sadorus . |
| 4,547,630 | 10/1985 | Giammarrusco . |
| 4,555,601 | 11/1985 | Taguchi . |
| 4,559,583 | 12/1985 | Ku . |
| 4,562,315 | 12/1985 | Aufderheide . |
| 4,564,954 | 1/1986 | Nittaya et al. . |
| 4,607,747 | 8/1986 | Steiner . |
| 4,611,262 | 9/1986 | Galloway et al. . |
| 4,616,213 | 10/1986 | Danish . |
| 4,624,464 | 11/1986 | Propsom . |
| 4,635,939 | 1/1987 | Makow . |
| 4,636,881 | 1/1987 | Brefka et al. . |
| 4,656,469 | 4/1987 | Oliver et al. . |
| 4,664,634 | 5/1987 | Cutler et al. . |
| 4,674,985 | 6/1987 | Orenstein et al. . |
| 4,677,657 | 6/1987 | Nagata et al. . |
| 4,703,573 | 11/1987 | Montgomery et al. . |
| 4,706,536 | 11/1987 | Sanders . |
| 4,712,673 | 12/1987 | Moore . |
| 4,733,127 | 3/1988 | Takasu et al. . |
| 4,749,354 | 6/1988 | Kerman . |
| 4,752,230 | 6/1988 | Shimizu . |
| 4,753,439 | 6/1988 | O'Brian . |
| 4,755,789 | 7/1988 | Paschal . |
| 4,763,898 | 8/1988 | Hemmann . |
| 4,765,623 | 8/1988 | Cardillo et al. . |
| 4,778,391 | 10/1988 | Weiner . |
| 4,791,741 | 12/1988 | Kondo . |
| 4,795,861 | 1/1989 | O'Rourke . |
| 4,809,246 | 2/1989 | Jeng . |

| | | |
|---|---|---|
| 4,818,827 | 4/1989 | Ipcinski et al. . |
| 4,824,376 | 4/1989 | Arash . |
| 4,825,319 | 4/1989 | Andreas . |
| 4,830,618 | 5/1989 | David . |
| 4,866,865 | 9/1989 | Yang . |
| 4,884,974 | 12/1989 | DeSmet . |
| 4,891,775 | 1/1990 | McWherter . |
| 4,913,432 | 4/1990 | Barra . |
| 4,939,428 | 7/1990 | DePauli . |
| 4,961,579 | 10/1990 | Thompson et al. . |
| 4,969,209 | 11/1990 | Schwob . |
| 4,984,825 | 1/1991 | Fowler . |
| 4,987,275 | 1/1991 | Miller et al. . |
| 4,990,092 | 2/1991 | Cummings . |
| 4,991,877 | 2/1991 | Lieberman . |
| 4,997,374 | 3/1991 | Simone . |
| 4,998,727 | 3/1991 | Person . |
| 5,000,019 | 3/1991 | Squillante et al. . |
| 5,040,790 | 8/1991 | Anthes et al. . |
| 5,055,053 | 10/1991 | Hyman . |
| 5,063,698 | 11/1991 | Johnson et al. . |
| 5,087,043 | 2/1992 | Billings et al. . |
| 5,106,090 | 4/1992 | Greenwood . |
| 5,113,340 | 5/1992 | McWherter . |
| 5,120,065 | 6/1992 | Driscoll et al. . |
| 5,122,062 | 6/1992 | Cutler et al. . |
| 5,127,869 | 7/1992 | Hanzawa . |
| 5,163,844 | 11/1992 | Hollis, Jr. et al. . |
| 5,167,508 | 12/1992 | McTaggart . |
| 5,178,545 | 1/1993 | Thompson . |
| 5,203,705 | 4/1993 | Hardy et al. . |
| 5,209,665 | 5/1993 | Billings et al. . |
| 5,218,536 | 6/1993 | McWherter . |
| 5,226,822 | 7/1993 | Morris . |
| 5,246,252 | 9/1993 | Gaddis . |
| 5,249,965 | 10/1993 | Yianilos . |
| 5,271,627 | 12/1993 | Russell et al. . |
| 5,275,285 | 1/1994 | Clegg . |
| 5,277,429 | 1/1994 | Smith, III . |
| 5,277,588 | 1/1994 | Lin . |
| 5,289,389 | 2/1994 | Keller . |
| 5,290,190 | 3/1994 | McClanahan . |
| 5,314,340 | 5/1994 | Gaddis . |
| 5,333,313 | 7/1994 | Heising . |
| 5,356,296 | 10/1994 | Pierce et al. . |
| 5,358,280 | 10/1994 | Scales . |
| 5,374,195 | 12/1994 | McClanahan . |
| 5,407,357 | 4/1995 | Cutler . |
| 5,413,486 | 5/1995 | Burrows et al. . |
| 5,417,575 | 5/1995 | McTaggart . |
| 5,419,705 | 5/1995 | Sandvik . |
| 5,437,552 | 8/1995 | Baer et al. . |
| 5,484,292 | 1/1996 | McTaggart . |
| 5,597,183 | 1/1997 | Johnson . |
| 5,636,995 | 6/1997 | Sharpe .................................... 434/317 |
| 5,645,432 | 7/1997 | Jessop . |

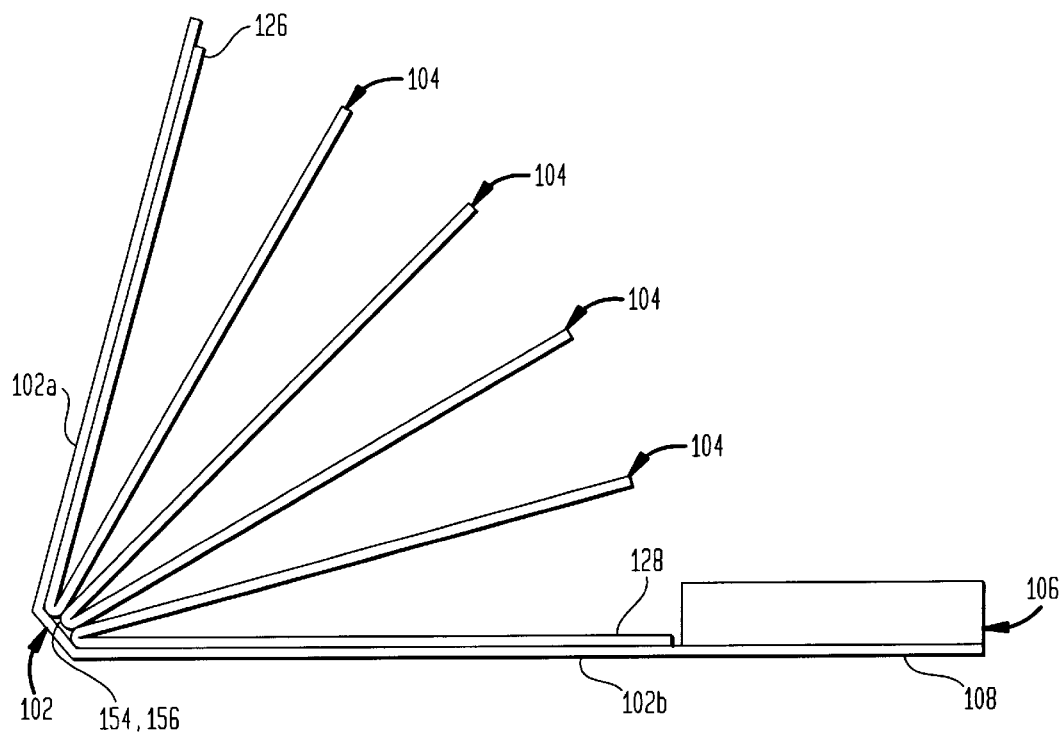
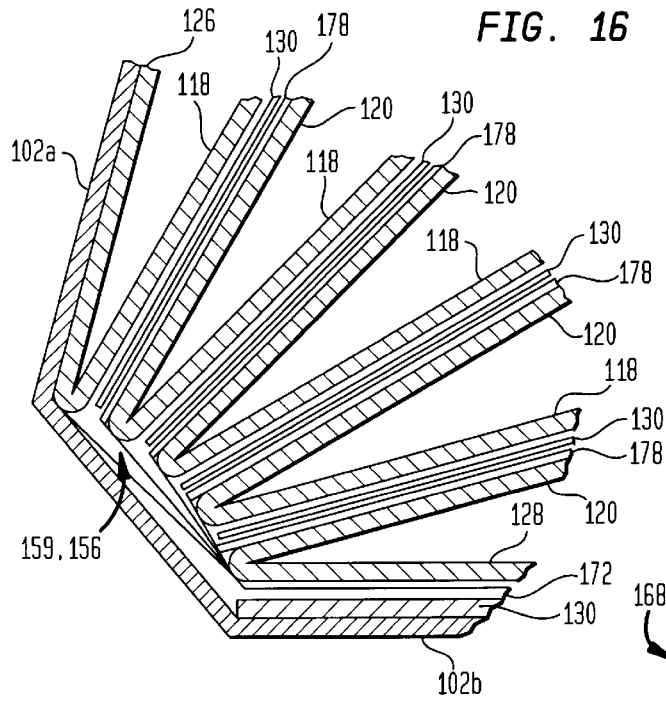
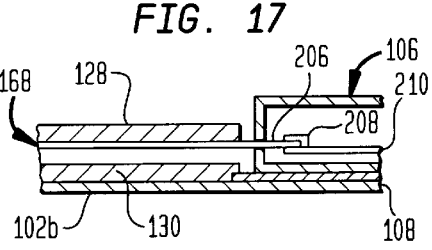

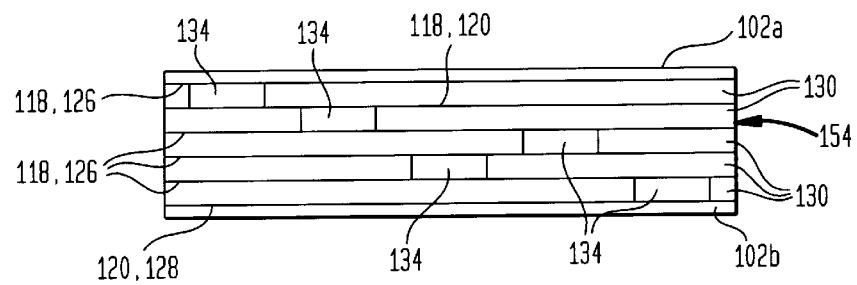
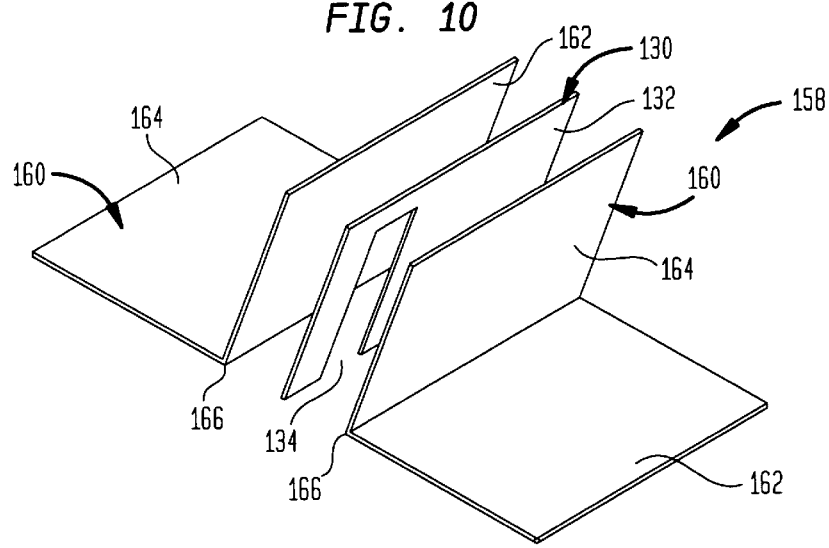
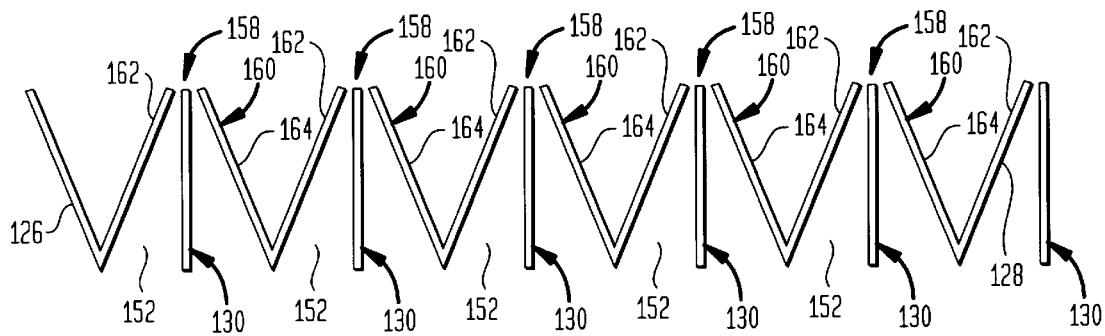

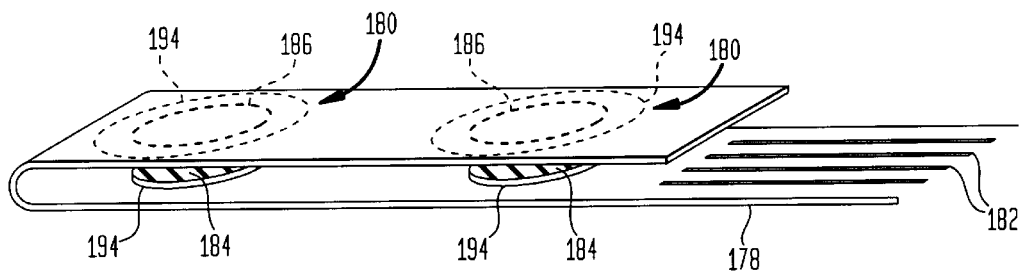
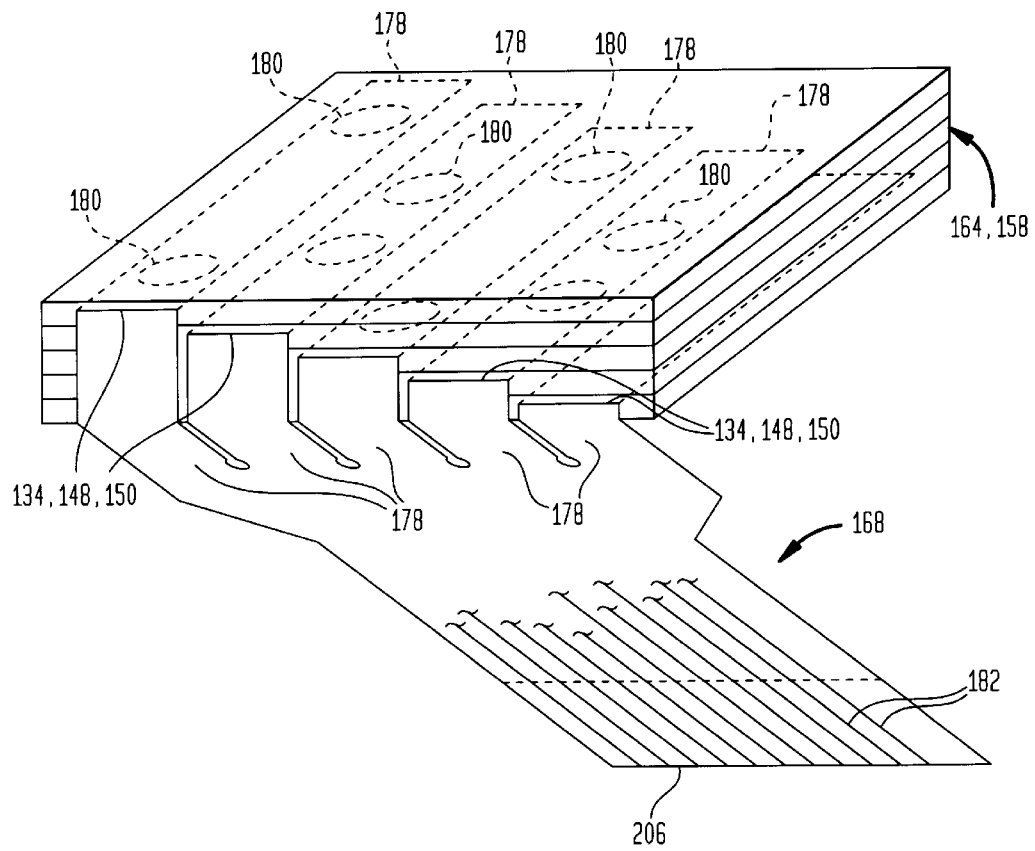

METHOD FOR MAKING AN ELECTRONIC BOOK FOR PRODUCING AUDIBLE SOUNDS IN RESPONSE TO VISUAL INDICIA

RELATED APPLICATION

The present application is a divisional application of prior application Ser. No. 08/723,681, filed Sep. 30, 1996, now U.S. Pat. No. 5,803,748.

FIELD OF THE INVENTION

The present invention relates in general to an apparatus for producing audible sounds in response to visual indicia, and more particularly, to an electronic book which uniquely associates any one of a plurality of visual indicia with related audible sounds under the selective control of the reader to enhance the learning process and reader enjoyment, or to provide other skill learning functions such as quiz books and the like.

BACKGROUND OF THE INVENTION

An electronic book which combines audible sounds and visual indicia is useful for a variety of purposes, for example, quiz books for testing one's skill and knowledge, books for enhancing the comprehension and retention of displayed information, books for storytelling and learning experience and the like. Electronic books of the aforementioned type require the integration of audible sounds and visual indicia which can be selectively addressed by the user when, for example, responding to visual and/or audio prompts, while at the same time, minimizing the requirement for fine motor skills which are frequently not possessed by small children.

There are known a number of so called "electronic books" which purport to fulfill the aforementioned requirements of an apparatus which combines audible sounds and visual indicia. By way of example, apparatuses of the aforementioned type are known from Oliver, et al., U.S. Pat. No. 4,656,469; Montgomery, et al., U.S. Pat. No. 4,703,573; Jeng, U.S. Pat. No. 4,809,246; Cummings, U.S. Pat. No. 4,990,092; Billings, et al., U.S. Pat. No. 5,209,665; McClanahan, U.S. Pat. No. 5,290,190; and McTaggert, U.S. Pat. Nos. 5,167,508, 5,417,575 and 5,484,292.

Oliver, et al. and Montgomery, et al. disclose a children's book having at least two turnable pages incorporating a visual image display for example, a liquid crystal display, having visible and invisible states, as well as a sound synthesizer operative in association with the visual image display. Electrical signals are coupled to the visual display and sound synthesizer for selectively and reversibly changing the display from the invisible to the visible state and the sound synthesizer from the inactive to sound generating state when the pages of the book are turned.

Jeng discloses a sound illustrated book including a plurality of pages bearing visual indicia which are alignable with corresponding pressure sensitive switches or photo resistors of an audible sound reproducing circuit for generating audible sounds therefrom. Cummings discloses a electronic book having a plurality of pressure sensitive switches positioned within the back cover supporting a sound generating module. The individual pages of the book are provided with visual indicia which align over the switches when the book is open. Pressing through one or more pages on any one visual indicia activates its corresponding underlying switch to generate audible sounds.

Billings, et al. discloses an audio visual book including a plurality of pages having a text portion in the form of both a plurality of lines of text and a plurality of different predetermined graphic depictions related in concept to the subject matter of the text and interposed within the lines of text. A switch assembly is disposed in predetermined relationship to the text portion and includes a plurality of individual actuable switches associated with one of the graphic depictions. A digital sound generator is responsive to actuation of one of the switches for selectively effecting generation of audible sounds.

McClanahan discloses an electronic book constructed from a plurality of pages each having an internal pressure sensitive switch operable from opposite sides of the page. The sound generating components of the book are separately located in a module forming a binding for the book. The McTaggert Patents disclose an electronic book similar to McClanahan, but wherein the individual leaves are formed from a continuous accordion folded sheet or a plurality of modular folded sheets joined back-to-back to form the pages of the book. The folded sheets include a so called "living hinge" which enable the leaves to be turned from page to page." The electronic circuit including the pressure sensitive switches and conductive paths are screen printed using conductive ink onto the leaves of the book which extend to an electronic module for connecting therewith.

As to the aforementioned prior art electronic books, a number of such books are referred to as "board books" such as McTaggert, Montgomery, et al., Oliver, et al. and McClanahan, wherein the electronic circuit and pressure sensitive switches are confined within the interior of the leaves. This construction necessitates that the process for creating the printed electronic circuit be integrated with the manufacturing process of each of the leaves of the book. The electronic circuit, such as shown in the McTaggert Patents are produced by screen printing a conductive ink of the desired pattern having the conductive paths and pressure sensitive switches incorporated therein. However, in the McTaggert Patents the conductive paths must extend over the fold lines and/or living hinges within the leaves. This results in the electronic books being unreliable as the conductive paths are highly subject to cracking at these locations, particularly at the living hinge, causing a break in electrical continuity to a portion of the electronic circuit.

In addition, it can be appreciated that the art and technology of conventional book making is quite different from the art and technology of screen printing conductive inks. It is therefore desirable to design an electronic book which enables the production of the entire book itself, independent of the electronic circuit. This allows greater flexibility in book construction and electronic circuit design which would otherwise be permitted when the two are integrated in the manner disclosed in the known electronic books of the board type.

It is accordingly an object of the present invention to obviate many of the deficiencies of known electronic books and to provide a novel apparatus for producing audible sounds in response to visual indicia which is easy to manufacture and assemble using conventional book making and screen printing technologies.

It is another object of the present invention to provide a novel apparatus for producing audible sounds in response to visual indicia in which the electronic circuit is produced independent of the book leaves, while at the same time, being fully integratable during the final assembly process.

It is another object of the present invention to provide a novel apparatus for producing audible sounds in response to visual indicia which eliminates the need to screen print conductive paths across fold lines and living hinges so as to improve the reliability and useful life of the electronic book.

It is another object of the present invention to provide a novel apparatus for producing audible sounds in response to visual indicia in which the pressure sensitive switches that control the generation of audible sounds are contained entirely internal of the leaves of the book.

It is another object of the present invention to provide a novel apparatus for producing audible sounds in response to visual indicia which is suitable for use for educational, testing or entertainment purposes.

It is another object of the present invention to provide a novel apparatus for producing audible sounds in response to visual indicia which provides great versatility in the ability to adapt the principles and concepts of the present invention to a variety of electronic book designs and physical embodiments thereof.

It is another object of the present invention to provide a novel apparatus for producing audible sounds in response to visual indicia which can accommodate talking books having multiple leaves, each of which may or may not include pressure sensitive switches and corresponding visual indicia for creating audible sounds.

SUMMARY OF THE INVENTION

The present invention discloses an apparatus in the nature of an electronic book for producing audible sounds in response to visual indicia constructed using board book technology. In this regard, the electronic book is constructed from a plurality of leaves which are formed from a continuous accordion folded sheet or individual modular folded sheets joined back-to-back to form the pages of the book. During the construction of each leaf, a spacer is internally provided to create at least one internal passageway, and if desired a plurality- of internal passageways, opening at one end of the leaves at the location forming the book's binding.

An electronic circuit including conductive paths and pressure sensitive switches is screen printed onto the surface of a flexible dielectric substrate using a conductive ink. Each of the switches include a switch circuit grid and a spaced apart shorting pad which is arrangeable overlying the switch circuit grid by folding an elongated member of the dielectric substrate over itself. In another embodiment, the switch circuit grid may be provided on a separate member from the shorting pad which are arranged overlying each other and secured in place by a suitable adhesive, tape or the like. Each of the elongated members containing the switches are inserted into a respective internal passageway within the leaves of the book. Visual indicia is printed onto the surface of each leaf overlying one of the switches. An electronic module is provided on the book in electrical connection with the conductive paths leading from the switches. By activation of a switch by pressure applied to the visual indicia, audible sounds are produced by a sound generator controlled by a microprocessor within the electronic module. The microprocessor can be preprogrammed to produce any audible sound or sequence of sounds desired, for example, individual words or sentences related to the visual indicia corresponding to the switch pressed, songs or sound effects.

In accordance with one embodiment of the present invention there is described an electronic book comprising a plurality of leaves forming pages of the book, at least one leaf including an internal passageway having an accessible opening, and a switch circuit formed independently of the leaves having at least one switch therein, the switch circuit extending into the passageway through the opening whereby the switch is operable in response to pressure applied to the leaf overlying the switch.

In accordance with another embodiment of the present invention there is described an electronic book comprising a plurality of leaves forming pages of the book, spacer means within at least one leaf for forming an internal passageway within the leaf having an accessible opening, and a switch circuit having a first segment received within the passageway and a second segment extending through the opening, the switch circuit including at least one switch in the first segment in electrical connection with at least one conductive path in the second segment, the switch including first and second spaced apart elements arranged overlying each other within the passageway creating an electrical connection therebetween in response to pressure applied to the leaf overlying one of the elements.

In accordance with another embodiment of the present invention there is described an electronic book comprising a plurality of leaves forming pages of the book having a binding, a spacer arranged between adjacent pages forming the leaves providing an internal passageway having an opening accessible at the binding, a switch circuit on a flexible support having at least one elongated segment received within the passageway and another segment extending outwardly of the binding through the opening, the switch circuit including at least one switch element provided on the elongated segment in electrical connection with a conductive path provided on the another segment, the switch including first and second elements spaced apart on the elongated segment, the elongated segment folded over itself such that the first element normally is isolated from the second element in overlying relationship, visual indicia on a predetermined portion of the leaf overlying one of the elements, and generating means in electrical connection with the conductive path operative for generating audible sounds upon effecting an electrical connection between the first and second elements in response to a pressure applied to the visual indicia.

In accordance with another embodiment of the present invention there is described a method for making an electronic book comprising forming a plurality of leaves providing pages of the book, providing an internal passageway within at least one leaf having an accessible opening, independently of the leaves forming a switch circuit having at least one switch therein, and inserting the switch circuit into the passageway through the opening whereby the switch is operable in response to pressure applied to the leaf overlying the switch.

In accordance with another embodiment of the present invention there is described a method for making an electronic book comprising forming a plurality of leaves providing pages of the book, providing an internal passageway within at least one leaf having an accessible opening, forming a switch circuit having a first segment including at least one switch and a second segment including at least one conductive path in electrical connection with the at least one switch, the switch including first and second spaced apart elements, arranging the first and second elements overlying each other, inserting the first segment having the at least one switch into the passageway through the opening with the second segment having the at least one conductive path extending therefrom, the first and second elements creating an electrical connection therebetween in response to pressure applied to the leaf overlying one of the elements.

In accordance with another embodiment of the present invention there is described a method for making an electronic book comprising forming a plurality of leaves providing pages of the book having a binding, providing at least one spacer within at least one leaf having an internal passageway providing an opening accessible at the binding, forming a switch circuit on a flexible support having at least one elongated segment, the switch circuit including at least one switch element having first and second spaced apart elements provided on the elongated segment in electrical connection with a conductive path provided on another segment of the support, folding the elongated segment over itself such that the first element normally is isolated from the second element in overlying relationship, providing visual indicia on a predetermined portion of the leaf, inserting the first segment having the at least one switch into the passageway through the opening with the second segment having the at least one conductive path extending therefrom, arranging one of the first and second elements underlying the visual indicia and providing generating means in electrical connection with the conductive path operative for generating audible sounds upon effecting an electrical connection between the first and second elements in response to a pressure applied to the visual indicia.

In accordance with another embodiment of the present invention there is described a switch circuit for assembly in an electronic book having a plurality of leaves forming pages, the switch circuit comprising a support having a plurality of elongated segments, a switch including first and second spaced apart elements arranged overlying each other provided on the elongated segments, and a conductive path provided on the support in electrical connection with one of the elements, the elongated segments insertable within an interior region of the leaves for actuation in response to pressure applied thereto.

BRIEF DESCRIPTION OF THE DRAWINGS

The above description, as well as further objects, features and advantages of the present invention will be more fully understood with reference to the following detailed description of an apparatus for producing audible sounds in response to visual indicia, for example, an electronic book, when taken in conjunction with the accompanying drawings, wherein:

FIG. 7 is a side elevational view showing the assembled relationship of the continuous accordion folded sheet and the spacers forming the plurality of leaves of the electronic book;

FIG. 8 is an end view of the binding of the electronic book illustrating the locations of the internal passageways formed by the spacers arranged internally within the leaves in accordance with one embodiment of the present invention;

FIG. 10 is a perspective view of another embodiment of a book leaf constructed from a pair of folded modular sheets joined back-to-back with a spacer as disclosed in FIGS. 3a–3e arranged therebetween;

FIG. 11 is a side elevational view of the unassembled relationship of the book leaves constructed from the plurality of folded modular sheets and the individual spacers of FIGS. 3a–3e;

FIG. 14 is a perspective view of the operative relationship between the switch circuit grid and shorting pad in accordance with the present invention;

FIG. 15 is a perspective end view of the binding of the electronic book showing insertion of the switch circuit into the internal passageways within the leaves;

FIG. 16 is an enlarged partial side elevational view of the binding of the electronic book showing insertion of the switch circuit into the internal passageways within the leaves;

FIG. 17 is a partial cross-sectional view showing the electrical connection of the conductive paths of the switch circuit to the electronic module;

DETAILED DESCRIPTION OF THE PREFERRED EMBODIMENTS

Figure 1:
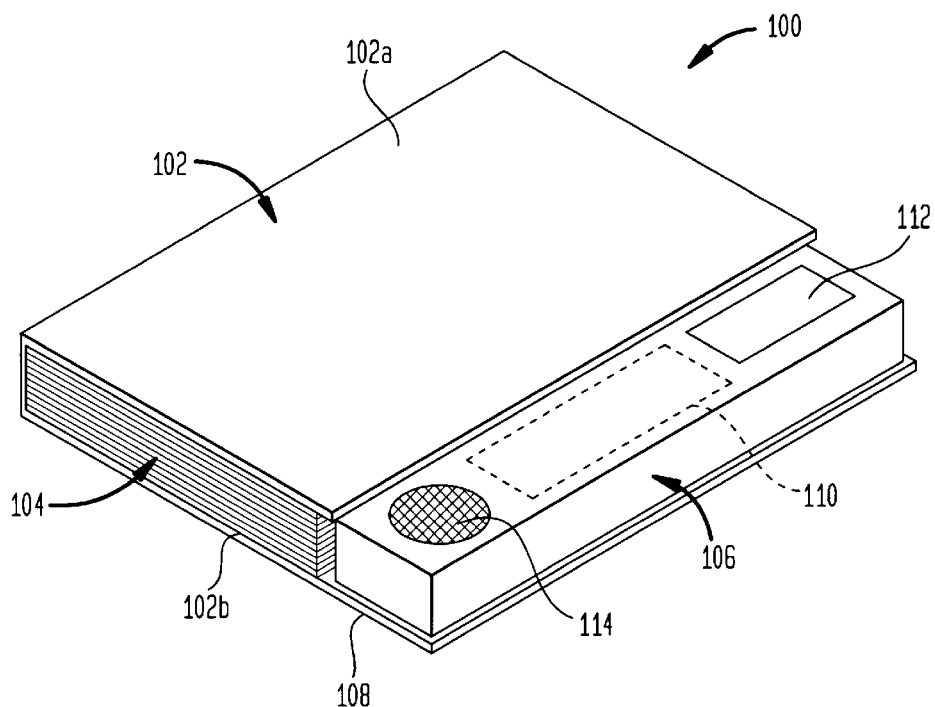
FIG. 1 is a perspective view of an apparatus for producing audible sounds responsive to visual indicia in the nature of an electronic book.
Figure 2:
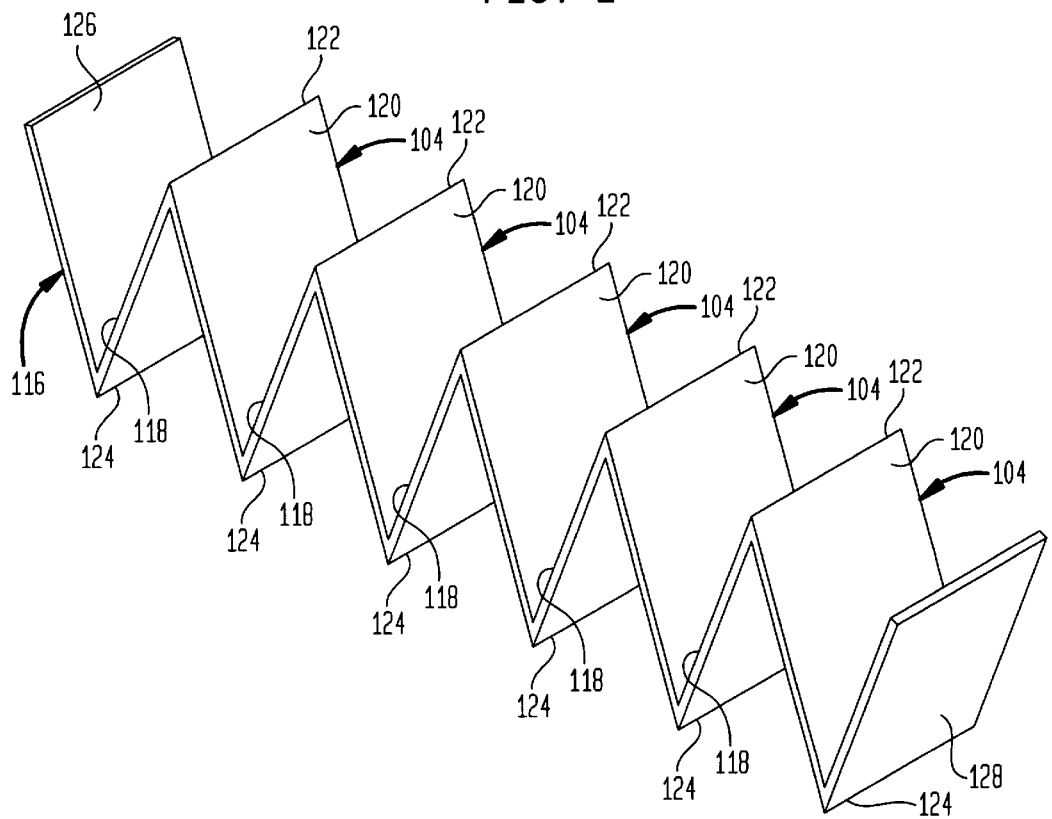
FIG. 2 is a perspective view of one embodiment of a plurality of book leaves constructed from a continuous sheet folded in accordion fashion.

Referring now to the drawings, wherein like reference numerals represent like elements, there is shown in FIG. 1 an apparatus for reproducing audible sounds in response to visual indicia whose construction, as to be described hereinafter, lends itself suitable for a variety of applications. For example, the apparatus will be described for illustrative purposes only, as a talking electronic book. However, it is to be understood that other applications for an apparatus, for example, an electronic quiz book and the like are within the scope of the present invention. In this regard, the construction of the electronic book of the present invention lends itself suitable for combining audible sounds and visual indicia for a variety of end applications.

Referring to FIG. 1, there is disclosed an electronic book 100 constructed in accordance with one embodiment of the present invention. The book 100 generally includes a cover 102 having front and back covers 102a, 102b, a plurality of leaves 104 forming pages, an electronic module 106 and an internal switch circuit (not shown). The cover 102 may be printed with the title of the electronic book, as well as pictures and other text and graphic images to entice the reader. The electronic module 106 is shown attached to an extension 108 of the cover 102 adjacent the right side of the leaves 104. However, it is to be understood that the electronic module 106 may be attached to a similar extension at the top or bottom of the electronic book 100. The electronic module 106 includes, by way of example, an electronic control circuit 110, a battery compartment 112 and a speaker 114.

In describing the electronic book 100, the construction of the book leaves 104 will first be described, followed by a detailed description of the switch circuit and the electronic control module 110. Briefly by way of overall construction, the electronic book 100 includes a plurality of leaves which form turnable pages of the book. The leaves are constructed, by way of example, from either a continuous accordion folded sheet or individual modular folded sheets joined back-to-back to form the pages of the book. However, other book making techniques such as stitching individual sheets together to form a binding and the like may be used to construct a plurality of leaves forming the pages of the book. During construction of each leaf, a spacer in the form of, by way of example, a continuous accordion folded sheet or an individual member is internally positioned within the leaf to create an internal passageway opening at one end of the leaves at the location forming the book's binding.

Independent of the construction of the leaves, an electronic switch circuit including conductive paths and pressure sensitive switches is screen printed onto the surface of a flexible dielectric substrate using a conductive ink. The switches are constructed from two elements, a switch circuit grid and a spaced apart shorting pad which are formed on an elongated segment of the dielectric substrate. The elongated segment is folded over itself such that the shorting pad is arranged overlying its corresponding switch circuit grid in spaced apart relationship. Each of the elongated segments are inserted into a respective internal passageway within the leaves of the book through the binding. Visual indicia such as graphic images, words or text is printed on the surface of each leaf overlying one of the switches or on a separate sheet which is adhered to the leaves. By activation of a switch by pressure applied to the visual indicia on the leaf, audible sounds are produced by the sound generator controlled by the microprocessor within the electronic module. In addition to the audible sounds, light emitting devices such as LCD's and LED's may be integrated into the electronic switch circuit to be visible through the pages when activated such as by operation of the switches.

Referring now to FIGS. 2–5, there will be described the construction of the individual leaves 104 which form the pages of the book in accordance with one embodiment of the present invention. As shown in detail in FIG. 2, a continuous sheet 116 of material suitable for making leaves 104, such as in a board book, is folded into equal segments in accordion fashion to form the respective leaves 104. As to be described hereinafter, the first and last leaf segments 126, 128 are used for attaching the leaves 104 once in assembled form to the cover 102. Each of the leaves 104 form an odd numbered page 118 and an adjacent even numbered page 120 joined by outside folds 122 and inside folds 124. The inside folds 124 form a living hinge which enable folding of the sheet 116 in accordion fashion and the turning of the leaves 104 upon completion of the electronic book 100. The outside folds 122 also form a living hinge which enables the folding of the sheet 116 in accordion fashion.

Generally, a living hinge is formed by creating a hinge line by scoring or compressing it into the material constituting the sheet 116. In this regard, the material used for the sheet 116 may vary from pure paper to pure synthetic materials, including a variety of composite materials. For example, materials known as chipboard and whiteboard having a thickness in the range of about 8–24 thousandths of an inch are suitable for constructing the leaves 104 in practicing the various embodiments of the present invention in that they can be folded for long term durability and use while maintaining the operative characteristics of the living hinge. These materials may be coated with a protective varnish to prevent the pages from getting soiled.

Figure 3A:
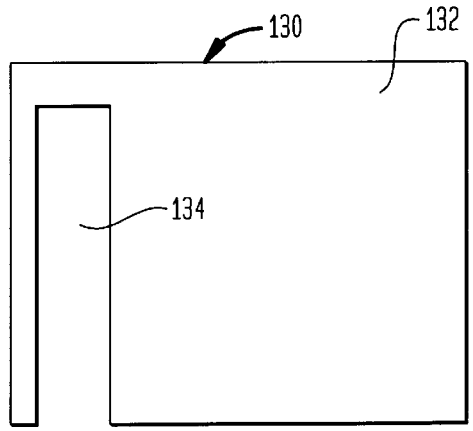
FIGS. 3a–3e are plan views of a plurality of individual spacers each having cutouts forming passageways constructed in accordance with one embodiment of the present invention.
Figure 3B:
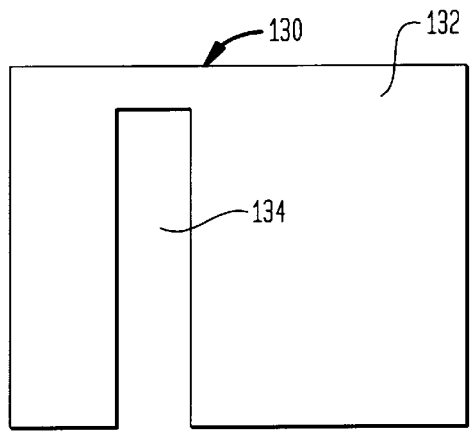
Figure 3C:
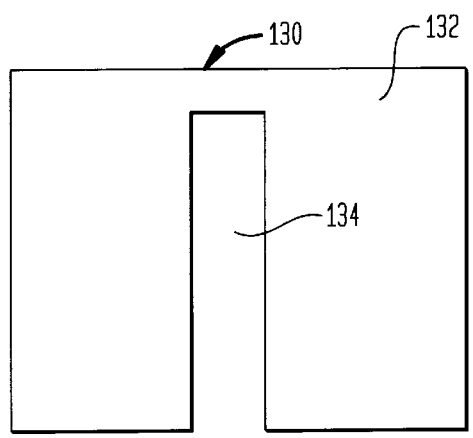
Figure 3D:
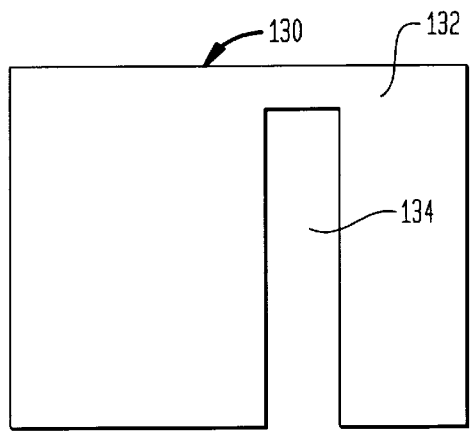
Figure 3E:
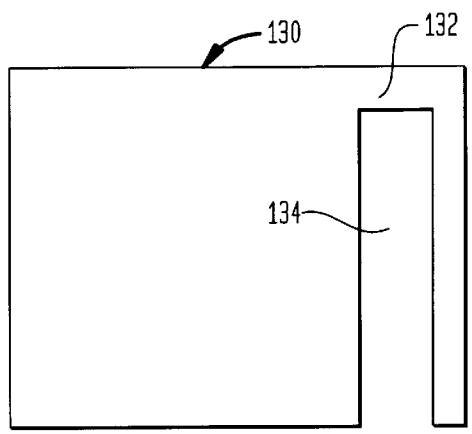

The accordion folded sheet 116 is assembled with a plurality of spacers 130, one embodiment of which is shown in FIGS. 3a–3e. As illustrated, the spacer 130 is generally sized and shaped to conform to the size and shape of the leaves 104. In this regard, there is generally provided at least one spacer 130 for each of the leaves 104, that is, for each leaf where a switch is to be incorporated for activation of audible sounds. The spacers 130 are formed as a generally rectangular member 132 from suitable material such as the material from which sheet 116 is constructed. Generally, the material for the spacers 130 would not be coated with a protective varnish as noted for the sheet 116. Each of the spacers 130 include an elongated cutout in the form of a passageway 134 opening at one edge of the spacer. Although only one passageway 134 has been illustrated within each of the spacers 130, it is to be understood that a plurality of passageways may be provided as to be described. The passageways 134 are arranged offset from one another so as to be generally out of alignment with each other when the spacers are inserted within the leaves 104 during the assembly process. Generally, as shown in FIGS. 3a–3e, the passageways 134 are staggered from the left side (FIG. 3a) of the spacer progressively toward the right side of the spacer (FIG. 3e). However, as will become apparent hereinafter, the arrangement of the passageways 134 may vary from that disclosed from the illustrated embodiment.

Figure 4:
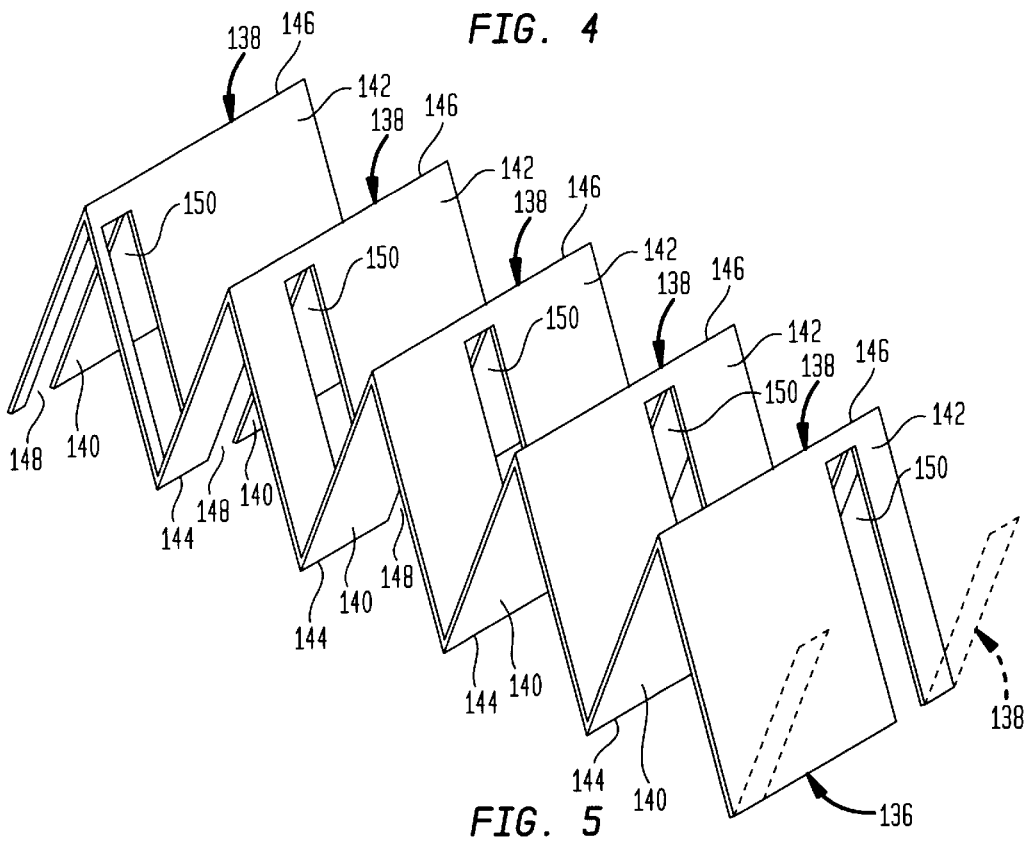
FIG. 4 is a perspective view of a plurality of spacers constructed in accordance with another embodiment of the present invention from a continuous sheet folded in accordion fashion having cutouts forming passageways.

Although the spacers 130 have been described as individual members 132, they may be constructed from a continuous sheet 136 folded in accordion fashion as shown in FIG. 4. In this regard, a continuous sheet 136 is folded to form spacers 138 each formed from a pair of members 140, 142 joined together by inside folds 144 and outside folds 146. Each of the members 140, 142 forming a respective spacer 138 are provided with a cutout in the form of an elongated passageway 148, 150 which are arranged in alignment with each other. However, the passageways 148, 150 from one spacer 138 to another are offset or staggered from each other as previously noted with respect to the passageways 134 of the spacers 130 described with respect to FIGS. 3a–3e. It should be apparent that the depth of each of the passageways 148, 150 is dependent upon the thickness of the sheet 136 from which the members 140, 142 are formed. similarly, with respect to the spacers 130, the depth of the passageways 134 is dependent upon the thickness of the individual members 132. Although only one passageway 148, 150 is shown within its corresponding member 140, 142, a plurality of passageways may also be provided within each of the members which are in alignment with each other, while being generally offset from the passageways within adjacent spacers 138. In addition, it is also possible to eliminate one of the passageways 148 or 150 when the sheet 136 is of suitable thickness to accommodate the electronic switch circuit 168 as to be described.

Figure 5:
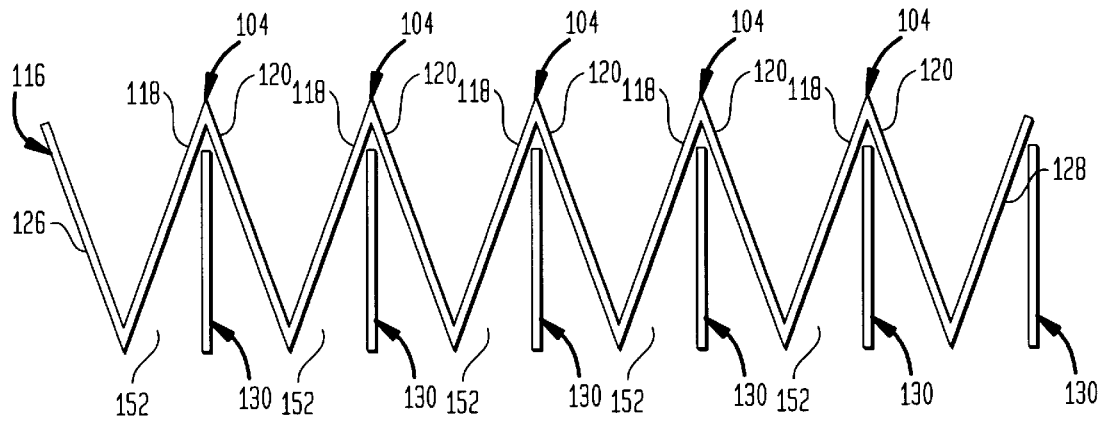
FIG. 5 is a side elevational view showing the unassembled relationship of the individual spacers of FIGS. 3a–3e with the continuous accordion folded sheet of FIG. 2 in forming the leaves of the electronic book.
Figure 6:
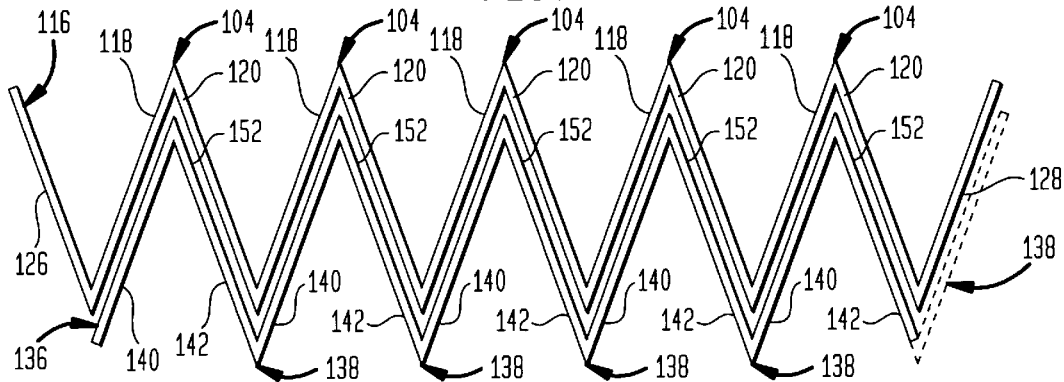
FIG. 6 is a side elevational view showing the unassembled relationship between the accordion folded spacers of FIG. 4 and the accordion folded sheet of FIG. 2 in forming the leaves of the electronic book.

Turning to FIGS. 5 and 6, the assembly of the accordion folded sheet 116 into a plurality of leaves 104 including a spacer 130 or 138 will now be described. As shown in FIG. 5, a spacer 130 in the form of an individual member 132 is inserted within the interior region 152 formed between the odd and even numbered pages 118, 120 of each of the leaves 104. A suitable adhesive is used for permanently joining the inside surface area of the odd and even numbered pages 118, 120 to the opposite surfaces of the spacers 130. However, the passageways 134 are left free of adhesive material to maintain free access to the interior of the passageway for receiving the switch circuit as to be described.

In a similar manner as shown in FIG. 6, the accordion folded sheet 136 forming the individual spacers 138 is nested within the interior region 152 formed between the odd and even numbered pages 118, 120 of each of the leaves 104. A suitable adhesive is used to permanently join the inner surfaces of the odd and even numbered pages 118, 120 to the outer surfaces of the members 140, 142 of each spacer 138. Similarly, a suitable adhesive is used to permanently join the inner facing surfaces of the members 140, 142 together to provide the plurality of integral leaves 104. During this process, the passageways 148, 150 in the members 140, 142 are aligned with each other to form a single passageway twice the depth of the thickness of the individual members. Where a large number of leaves 104 are to be produced, it may be desirable to join more than one sheet 116 together to form a continuous length. This can be accomplished either prior to or after the accordion folding of the sheet 116. In this regard, corresponding first and last leaf segments 126, 128 are bonded back-to-back with a spacer 130 disposed therebetween. By this construction, an infinite number of leaves 104 can be constructed using a plurality of accordion folded sheets 116 which are joined together.

For aesthetic reasons, it may be desirable to trim the outer edge of the leaves 104 which will remove the outside fold lines 122 to provide a more finished look. This is achieved using conventional cutting technology known in the construction of board books. In this event, the spacer 130 would be slightly narrower than the size of a leaf 104 to allow for an offset at the outside fold line 122. This is preferred in that the leaf 104 may otherwise tend to pull apart at the cut location.

As thus far assembled, where the individual spacers 130 are used the inside edges of the leaves 104 form a binding 154 of the book 100 as generally shown in FIG. 7 and in greater detail in FIG. 16. Where the accordion folded spacers 138 are used, a binding 156 is formed by the inside edges of the leaves 104 and the inside edges of the spacers. The binding 154, 156 as in a conventional board book, enables the turning of the individual leaves 104 by the reader upon opening the electronic book 100 in a conventional manner.

Referring now to FIG. 8, there is generally illustrated the binding 154 showing the arrangement and accessibility of the passageways 134 formed from the spacers 130. As previously described, each of the spacers 130 is provided with a passageway 134 which is accessible through the binding 154. Each of the passageways 134 are staggered or offset from one another. The particular location of the passageways within each of the spacers 130 has been shown by way of one illustration, and other arrangements falling within the scope of the present invention are contemplated. Further in this regard, although the passageways 134 have been described as being staggered or offset from one another, it is possible that they be arranged in partial or full alignment with passageways within the adjacent leaves 104.

Figure 9:
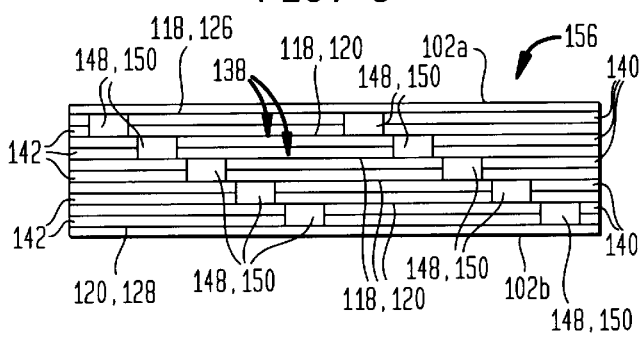
FIG. 9 is an end view of the binding of the electronic book illustrating the locations of the internal passageways formed by the spacers arranged internally within the leaves in accordance with another embodiment of the present invention.

Referring to FIG. 9, there is shown the binding 156 constructed from the inside edge of the spacers 138 and the inside edge (not shown) of the leaves 104. Once again, the passageways 148, 150 are accessible through the binding 156. As shown, each of the spacers 138 is provided with two pairs of passageways 148, 150 as opposed to a single passageway in the embodiment of FIG. 8. It should be appreciated that the number and arrangement of the passageways 134, 148, 150 can be varied to suit the particular requirements of the electronic book 100 desired, for example, the number and location of the internal switches which are operative in response to the visual indicia printed on the leaves 104 for generating audible sounds by the electronic module 106.

Referring to FIGS. 10 and 11, the construction of leaves 158 in accordance with another embodiment of the present invention will now be described. A pair of modular sheets 160 are folded into equal segments forming odd and even numbered pages 162, 164 of the leaves 158. The modular sheets 168 are folded about an inside fold line 16& to form a living hinge. A plurality of modular sheets 160 may be adhesively bonded together with a spacer 130 (see FIGS. 3a–3e) therebetween to form a plurality of leaves 158 as shown assembled in FIG. 11. Once assembled, the inside edge of the leaves 158 form a binding 154 such as that shown in FIG. 8.

The electronic book 100, as thus far described, includes a plurality of turnable leaves 104 constructed from an accordion folded continuous sheet 116 or folded modular sheets 160. Individual spacers 130 or spacers 138 formed from a continuous accordion folded sheet 136 is adhesively secured within the construction of the leaves 104, 158 so as to provide a plurality of passageways 134, 148, 150 accessible through the binding 154, 156. The electronic book 100, as constructed so far, is independent of any electronic circuit which is operative for generating audible sounds in response to user interaction.

Figure 12:
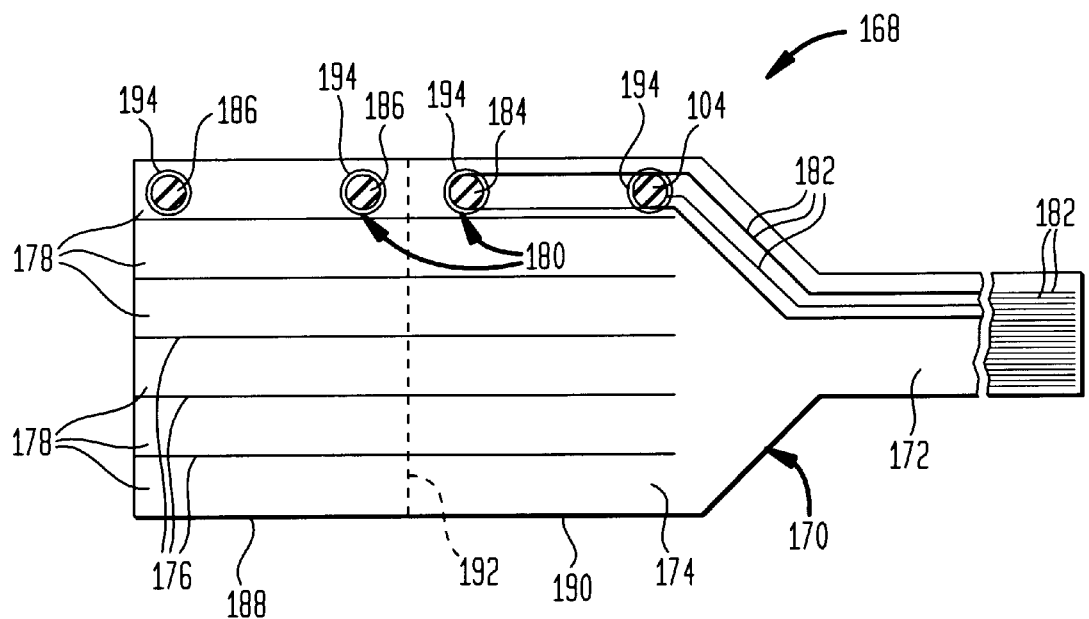
FIG. 12 is a top plan view of an exemplary layout of a printed switch circuit illustrating the pressure sensitive switches including switch circuit grids and shorting paths, and conductive paths.

Turning to FIG. 12, there is generally illustrated the layout of a switch circuit 168 in accordance with one illustrative embodiment of the present invention. The switch circuit 168 includes a sheet 170 of plastic material which may be fabricated from a wide variety of sheet materials which are electrically insulating and have good dielectric properties, while being adequately flexible to serve the switching function. One such material is polyester, for example, sold under the trademark Mylar. The sheet 170 is shaped to include an elongated tail 172 and a generally rectangular circuitry member 174 which is cut longitudinally via a plurality of cut lines 176 to provide a plurality of parallel elongated segments 178 in the nature of fingers.

The switch circuit 168 is constructed from dielectric and conductive screen printing inks using conventional screen printing technology known in the electronic industry. The conductive ink, for example carbon compounds, although silver and nickel compounds are also suitable, is used for fabricating a plurality of switches 180 and conductive path leads 182. Each of the switches 180 are constructed from a switch circuit grid 184 and a corresponding shorting pad 186. Initially, the switch circuit 168 is laid out on the sheet 170. As shown, the elongated segments 178 are divided into left and right sections 188, 190 by an imaginary fold line 192. The switch circuit grids 184 for each of the switches 180 are laid out within the right section 190 while the corresponding shorting pads 186 are laid out within the left section 188. The conductive path leads 182 extend from the switch circuit grids 184 where they terminate within the tail 172. Any number of switches 180 may be incorporated along each of the elongated segments 178 and overall within the switch circuit 168, dependent upon the ability to electrically isolate the conductive path leads 182, switch circuit grids 184 and shorting pads 186 as may be required from the layout of the switch circuit 168. In the embodiment illustrated in FIG. 12, the construction of two switches 180 will now be described.

Using conventional screen printing technology and carbon conductive ink, which may be of the ultraviolet light or thermal curing type, each of the conductive path leads 182, switch circuit grids 184 and shorting pads 186 are screen printed onto the surface of the dielectric sheet 170. During a second screen printing operation, a layer of dielectric spacer material is screen printed around the switch circuit grids 184 and shorting pads 186 to form a raised dielectric spacer 194. The raised dielectric spacers 194 have a thickness greater than the thickness of the switch circuit grids 184 and shorting pads 186 to prevent their shorting out when arranged in overlying relationship with each other as to be described. In an alternate embodiment, the dielectric spacers 194 may be constructed from die cut spacers formed of dielectric sheet material or by embossing the sheet 170 to have raised portions about the locations of the switch circuit grids 184 and shorting pads 186.

Figure 13:
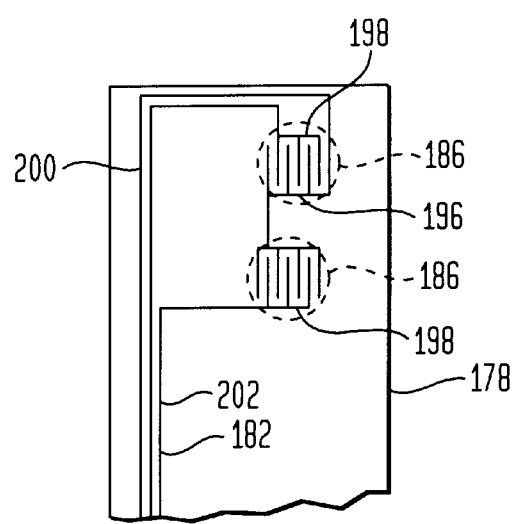
FIG. 13 is a top plan view showing an exemplary layout of the switch circuit grid.

One particular layout for the switch circuit grids 184 is illustrated in FIG. 13. By way of illustration, the switch circuit grid 184 is constructed from a pair of electrodes 196, 198 formed as spaced apart interdigitated fingers. Electrodes 196 of each of the switch circuit grids 184 are interconnected to a common lead 200. On the other hand, the other electrodes 198 are connected to separate conductive leads 202, 204. The shorting pads 186 as shown in FIG. 12 are generally constructed as a plurality of parallel conductive lines arrangeable perpendicular to the electrodes 196, 198 of the switch circuit grids 184. However, the shorting pads 186 can be constructed as solid dots. Although the switches 180 have been described with respect to a particular construction of the switch circuit grids 184 and shorting pads 186, it is to be understood that other constructions for low force membrane switches may be utilized in accordance with the present invention, see for example, Ipcinski, et al., U.S. Pat. No. 4,818,827 and employing the methods described therein.

The switch circuit 168 is completed by folding the left section 188 of each of the elongated segments 178 about fold line 192 overlying the right section 190. As shown in FIG. 14, this positions each of the shorting pads 186 overlying its corresponding switch circuit grid 184. The shorting pad 186 is spaced slightly above the switch circuit grid 184 due to the presence of the spacers 194 so as to prevent premature shorting of the switches 180.

The integration and assembly of the switch circuit 168 into the plurality of leaves 104, 158 to complete the construction of the electronic book 100 will now be described. Referring to FIGS. 15 and 16, each of the folded over elongated segments 178 are inserted into a corresponding one of the passageways 134, 148, 150 within the leaves 104, 158. As previously described, the passageways 134, 148, 150 are accessible from the binding 154, 156. Each of the switches 180 are positioned within the interior of the leaves 104, 158 underlying a predetermined region on each of the leaves.

Assembly of the electronic book 100 is completed by adhesively or otherwise bonding the first leaf segment 126 to the inside surface of the front cover 102a. The tail 172 of the switch circuit 168 is positioned overlying the inside surface of the back cover 102b and may be secured thereat by adhesively or otherwise bonding the last leaf segment 128 to the back cover. In the preferred embodiment as shown in FIGS. 5, 11 and 16, an individual spacer 130 in the nature of two spaced apart members forming a passageway 134 therebetween for freely receiving the tail 172 may be sandwiched between the back cover 102b and the last leaf segment 128. A similar spacer 138 may be used which is formed from the accordion folded sheet 136, which spacer is shown in phantom in FIG. 4 also constructed from two spaced apart members. This construction allows for the insertion of the switch circuit 168 even though the back cover 102b is bonded to the last leaf segment 128.

The end 206 of the tail 172 supporting the conductive path leads 182 extends overlying the extension 108 of the cover 102. As shown in FIG. 17, the end 206 of the tail 172 extends into the electronic module 106. The conductive path leads 182 are electrically connected to the circuitry within the electronic module 106 by physical pressure contact using, for example, a clamp 208 which can be screwed or otherwise snapped into secured position.

Figure 18:
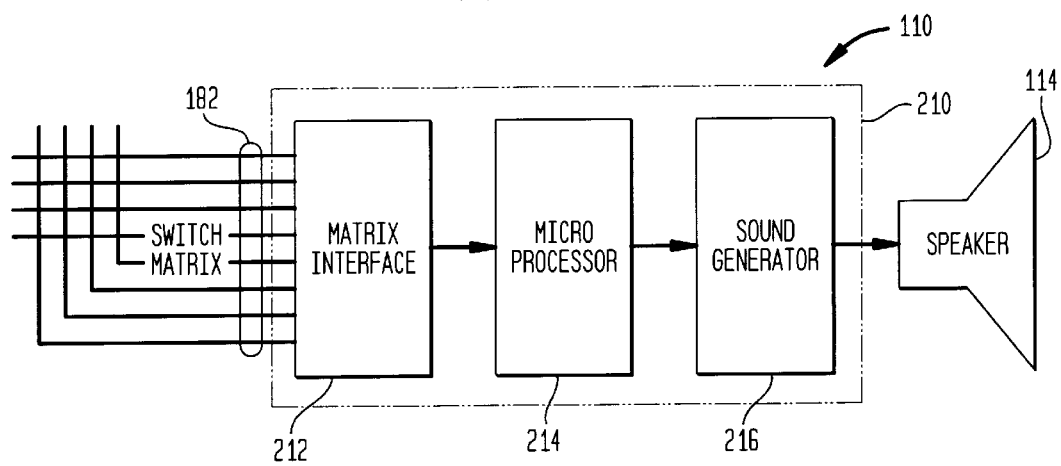
FIG. 18 is a block schematic diagram of the electronic circuit in the electronic module for generating audible sounds in accordance with one embodiment of the present invention.

The electronic module 106 for generating audible sounds includes an electronic control circuit 110 provided on a printed circuit board 210 as graphically illustrated in FIG. 18. The electronic control circuit 110 includes a matrix interface 212, a microprocessor 214 and a sound generator 216. The electronic control circuit 110 may be any circuit which, in response to actuation of the switches 180, generates a predetermined audio response. The matrix interface 212 is connected to the switches 180 through the conductive path leads 182 to generate, in accordance with conventional techniques, a signal to the microprocessor 214 indicative of the particular switch which is activated, for example, rendered conductive. A single chip which includes the matrix interface 212, microprocessor 214 and sound generator 216 is available from Mosel Vitelic, Inc. of Taiwan, I.C. #MSS-6605.

The microprocessor 214 is programmed to generate a sequence of one or more control signals to the sound generator 216, for example, a speech synthesis chip in response to actuation of the particular switch 180 using techniques well known in the art. The sequence of control signals can be predetermined or randomly chosen. In accordance with the one embodiment, a particular sequence of control signals is associated with each individual switch 180 or a sequence is chosen from a specific group of predetermined sequences corresponding to the switch, either randomly or in accordance with a predetermined criteria, e.g., a function of prior actuated switches. The sound generator 216 provides a signal to a speaker 114, a headphone or other conventional audio output device to generate predetermined sounds such as speech in accordance with the control signals provided by the microprocessor. Thus, in response to actuation of a particular switch 180, the electronic control circuit 110 effects generation of sounds such as speech in a predetermined or random manner.

Figure 19:
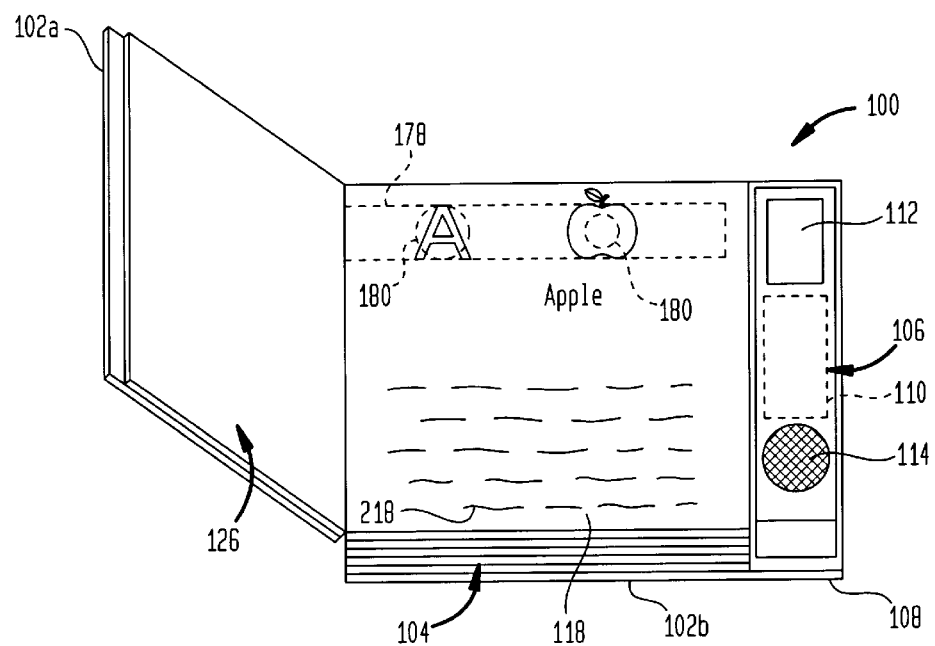
FIG. 19 is a perspective view of the general features of one embodiment of the electronic book of the present invention, illustrating an open spread with an alphabet letter and pictorial representation of related subject matter.

Referring to FIG. 19, there is illustrated an electronic book 100 in an open state to expose an odd numbered page 118. The location of a pair of switches 180 is illustrated in phantom. Printed on page 118 in registration with one of the switches 180 is the letter "A" and the picture of-an apple in registration with the other switch. Also provided on the page 118 is a number of lines of text 218. In operation, the reader by pressing on the visual indicia represented by the letter "A", will activate the underlying switch causing the electronic module 106 to generate a predetermined audible sound, such as, for example, the word "apple." Similarly, pressing on the visual indicia of the apple will activate its underlying switch 180 also causing the electronic module 106 to generate an audible sound, for example, sentences corresponding to the lines of text 218. By activation of the switches 180 and turning the subsequent leaves 104, various sounds such as speech can be generated from the electronic module 106. In this regard, the microprocessor 214 may be programmed to the particulars of the electronic book 100 desired.

Figure 20:
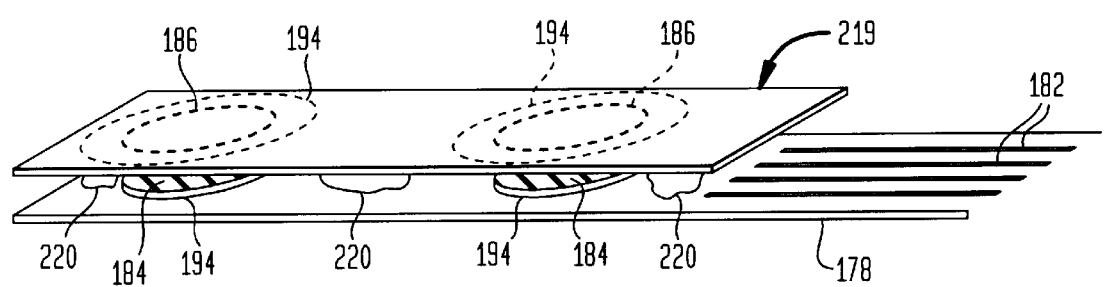
FIG. 20 is a perspective view of the operative relationship between the switch circuit grid and shorting pad in accordance with another embodiment of the present invention.

Referring to FIG. 20, there is disclosed a perspective view of the operative relationship between the switch circuit grids 184 and the shorting pads 186 in accordance with another embodiment of the present invention. In this regard, the shorting pads 186 are provided on an elongated member 219 which is separate from the elongated member 178. The elongated member 219 may also be constructed from a sheet of suitable dielectric material similar to sheet 170. The elongated member 219 is secured to the underlying elongated member 178 using, for example, adhesive 220, tape or the like so as to maintain registration between the shorting pads 186 and switch circuit grids 184. It can therefore be appreciated that the elongated member 219 may be either formed separate from elongated member 178 or integral therewith as previously described.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A method for making an electronic book comprising the steps of: forming a plurality of leaves providing pages of said book; providing an internal passageway within at least one of said leaves having an opening thereinto; forming a switch circuit on a common substrate having a first segment including at least one switch and a second segment including at least one conductive path in electrical connection with said at least one switch, said at least one switch including first and second spaced apart elements; arranging said first and second elements to overlie one another; inserting said first segment having said at least one switch into said passageway through said opening with said second segment having said at least one conductive path being external of said passageway so that said first and second elements create an electrical connection therebetween in response to pressure applied to said at least one leaf overlying one of said first and second elements.

2. The method of claim 1, wherein said step of providing an internal passageway within at least one of said leaves comprises inserting a spacer having at least one cutout within the interior of said at least one of said leaves.

3. The method of claim 2, further including the step of forming said spacer by folding a sheet in accordion fashion forming at least a pair of adjacent members.

4. The method of claim 2, wherein said step of forming said plurality of leaves comprises joining a plurality of individual folded sheets back-to-back with at least one spacer arranged therebetween.

5. The method of claim 2, wherein said the step of forming said plurality of leaves comprises folding a sheet in accordion fashion into a plurality of pairs of adjacent pages with at least one spacer arranged therebetween.

6. The method of claim 1, further including the step of providing sound generating means connected to said switch circuit for generating audible sounds responsive to the operation of said switch.

7. The method of claim 1, further including the step of providing visual indicia on said at least one leaf overlying said switch.

8. The method of claim 1, wherein said step of forming a plurality of leaves comprises folding a sheet in accordion fashion into a plurality of pairs of adjacent pages of said book.

9. The method of claim 8, wherein said step of forming said plurality of leaves comprises folding at least two sheets in accordion fashion into respective pluralities of pairs of adjacent pages and joining together said at least two accordion folded sheets in end-to-end relationship.

10. The method of claim 1, wherein said step of forming a plurality of leaves comprises joining a plurality of individual folded sheets back-to-back to provide said pages of said book.

11. The method of claim 1, in which said common substrate comprises a common flexible substrate, and wherein said step of arranging said first and second elements overlying each other comprises providing said first and second elements on said first segment of said common flexible substrate and folding said first segment over itself so that said first and second elements overlie one another.

12. The method of claim 1, further including the step of providing an internal passageway within each of said leaves each of which has an opening thereinto, and wherein said step of forming a switch circuit comprises forming a switch circuit on said common substrate so as to have a plurality of first segments and a common second segment, each of said first segments including at least one switch which includes first and second spaced apart elements and said common second segment including a conductive path in electrical connection with each of said switches.

13. The method of claim 12, further including the step of inserting each of said first segments of said common substrate into one of said passageways through its respective opening with said common second segment having said conductive paths thereon being arranged external of said passageways.

14. The method of claim 1, wherein said step of arranging said first and second elements to overlie one another comprises folding said first segment over itself.

15. The method of claim 1, wherein said step of providing sound generating means comprises connecting said second segment having said at least one conductive path to said sound generating means.

16. A method for making an electronic book comprising the steps of: forming a plurality of leaves providing pages of said book having a binding; providing at least one spacer within at least one of said leaves to provide an internal passageway within said at least one of said leaves which has an opening into said passageway accessible at said binding; forming a switch circuit on a flexible substrate having at least one elongated finger segment and a tail segment, said switch circuit including at least one switch having first and second spaced apart elements provided on said elongated finger segment and said switch circuit including a conductive path provided on said tail segment of said flexible substrate in electrical connection with said at least one switch; folding said at least one elongated finger segment over itself such that said first element normally is isolated from said second element in overlying relationship; providing visual indicia on a predetermined portion of said at least one of said leaves; inserting said at least one elongated finger segment having said at least one switch into said internal passageway through said opening with said tail segment having said at least one conductive path extending therefrom; arranging one of said first and second elements to underlie said visual indicia; and providing generating means in electrical connection with said at least one conductive path and operative to generate audible sounds upon effecting an electrical connection between said first and second elements in response to a pressure applied to said visual indicia.

17. The method of claim 16, wherein said spacer includes at least one cutout.

18. The method of claim 16, further including the step of providing a plurality of spacers within a corresponding plurality of said leaves, each of said spacers including at least one cutout forming an internal passageway within its corresponding leaf.

19. The method of claim 15, further including the step of forming said spacer by folding a sheet in accordion fashion forming at least a pair of adjacent members.

20. The method of claim 15, wherein said the step of forming said plurality of leaves comprises joining a plurality of individual folded sheets back-to-back with at least one spacer arranged therebetween.

21. The method of claim 15, wherein said the step of forming said plurality of leaves comprises folding a sheet in accordion fashion into a plurality of pairs of adjacent pages with at least one spacer arranged therebetween.

22. The method of claim 15, further including the step of providing a cover for said book and attaching said plurality of leaves thereto.

23. The method of claim 22, further including the step of positioning a cover spacer between said cover and one of said leaves attached to said cover, said cover spacer providing an internal passageway between said cover and said one of said leaves attached to said cover for receiving a portion of said tail segment therein.

24. The method of claim 16, further including the step of providing a spacer for each of said plurality of leaves to provide an internal passageway within each of said leaves and an opening thereinto accessible at said binding, and wherein said step of forming a switch circuit comprises forming a switch circuit on a flexible substrate having a plurality of elongated finger segments and a common tail segment, said switch circuit including at least one switch provided on each of said elongated finger segments and said switch circuit including a conductive path provided on said common tail segment in electrical connection with each of said switches.

25. The method of claim 24, further including the step of folding each of said elongated finger segments over itself and inserting each of said folded elongated finger segments into one of said passageways through its respective opening.

26. A method for making an electronic book comprising of steps of: forming a plurality of leaves providing pages of said book; providing an internal passageway within in at least one of said leaves and an opening into said internal passageway along an edge of said at least one leaf; independently of said leaves forming a switch circuit on a flexible substrate having a elongated finger segment and a tail segment, said switch circuit including at least one switch located on said elongated finger segment and an external portion located on said tail segment; inserting said elongated finger segment of said flexible substrate into said internal passageway through said opening so that said switch on said elongated finger segment is arranged so as to be operable in response to pressure applied to said at least one leaf overlying said switch; and operatively connecting sound generating means to said external portion of said switch circuit on said tail segment of said flexible substrate for generating an audible sound in response to operation of said switch.

27. The method of claim 26, further including the step of providing an internal passageway within each of said plurality of leaves and an opening into each of said internal passageways along an edge of each of said leaves; wherein said step of forming a switch circuit on a flexible substrate comprises providing a flexible substrate having a plurality of elongated finger segments and providing at least one switch on each of said plurality of elongated finger segments; and wherein said step of inserting comprises inserting each of said elongated finger segments into one of said passageways through its respective opening so that said switch thereon is arranged so as to be operable in response to pressure applied to said leaf overlying said switch.

28. The method of claim 27, wherein said step of forming said switch circuit further includes forming a plurality of individual circuit paths on said flexible substrate, each of which includes one of said switches on one of said elongated finger segments and an individual conductive path portion on said tail segment.

29. The method of claim 28, wherein said step of forming a plurality of leaves comprises joining said plurality of leaves along said edges having said openings into said internal passageways to form a binding for said book, and further including the step of arranging said tail segment of said flexible substrate so as to have a portion extend along said binding of said book.

30. The method of claim 29, further including the step of providing at least one cover and attaching said plurality of leaves to said cover, and further including the step of mounting said sound generating means on said at least one cover.

31. The method of claim 27, wherein said step of providing said internal passageways comprises providing said passageways within said leaves so as to be staggered from one another.

32. The method of claim 31, wherein said step of providing a flexible substrate having a plurality of elongated finger segments comprises cutting said flexible substrate so that said elongated finger segments are arranged laterally of one another.

33. The method of claim 27, wherein said step of forming a switch circuit comprises printing conductive ink on a flexible sheet of dielectric material.

34. The method of claim 26, wherein said at least one switch comprises first and second spaced apart elements provided on separate portions of said flexible substrate, and wherein said step of inserting said elongated finger segment of said flexible substrate into said passageway includes first securing said separate portions of said flexible substrate together such that said first and second elements are arranged overlying each other.

35. The method of claim 26, wherein said step of forming a plurality of leaves comprises folding a sheet in accordion fashion into a plurality of pairs of adjacent pages of said book.

36. The method of claim 35, wherein said step of forming said plurality of leaves comprises folding at least two sheets in accordion fashion into respective pluralities of pairs of adjacent pages and joining together said at least two accordion folded sheets in end-to-end relationship.

37. The method of claim 26, wherein said step of forming a plurality of leaves comprises joining a plurality of individual folded sheets back-to-back to provide said pages of said book.

38. The method of claim 26, wherein said step of providing an internal passageway within said at least one leaf comprises inserting a spacer within the interior of said at least one leaf.

39. The method of claim 38, further including the step of forming said spacer by folding a sheet in accordion fashion to provide at least a pair of adjacent members to form said spacer.

40. The method of claim 38, wherein said step of forming said plurality of leaves comprises joining a plurality of individual folded sheets back-to-back with at least one spacer arranged therebetween.

41. The method of claim 38, wherein said step of forming said plurality of leaves comprises folding a sheet in accordion fashion into a plurality of pairs of adjacent pages with at least one spacer arranged therebetween.

42. The method of claim 27, wherein said plurality of elongated finger segments each have thereon first and second spaced apart elements forming said switch, and wherein said step of inserting each of said elongated finger segments into each of said passageways includes first folding each said elongated finger segment over itself such that said first and second elements thereon are arranged overlying each other.

43. The method of claim 26, wherein said step of operatively connecting sound generating means comprises connecting said tail segment of said flexible substrate to said sound generating means.

44. The method of claim 26, further including providing visual indicia on said at least one leaf overlying said switch.

* * * * *

UNITED STATES PATENT AND TRADEMARK OFFICE
CERTIFICATE OF CORRECTION

| | | |
|---|---|---|
| PATENT NO. | : | 6,041,215 |
| DATED | : | March 21, 2000 |
| INVENTOR(S) | : | Maddrell et al. |

It is certified that error appears in the above-identified patent and that said Letters Patent is hereby corrected as shown below:

Column 8, line 59, "similarly," should read -- Similarly,--.
Column 10, line 22, "16&" should read -- 166 --.
Column 13, line 60, "said the step" should read -- said step --.
Column 13, line 64, "said the step" should read -- said step --.
Column 14, line 47, "claim 1" should read -- claim 6 --.
Column 15, line 18, "claim 15" should read -- claim 16 --.
Column 15, line 21, "claim 15" should read -- claim 16 --.
Column 15, line 21, "said the step" should read -- said step --.
Column 15, line 25, "claim 15" should read -- claim 16 --.
Column 15, line 25, "said the step" should read -- said step --.
Column 15, line 29, "claim 15" should read -- claim 16 --.

Signed and Sealed this

Twenty-seventh Day of February, 2001

NICHOLAS P. GODICI

*Attest:*

*Attesting Officer*    Acting Director of the United States Patent and Trademark Office